Jan. 11, 1949.   R. L. TUVE ET AL   2,458,540
SHARK REPELLENT
Filed Oct. 7, 1944
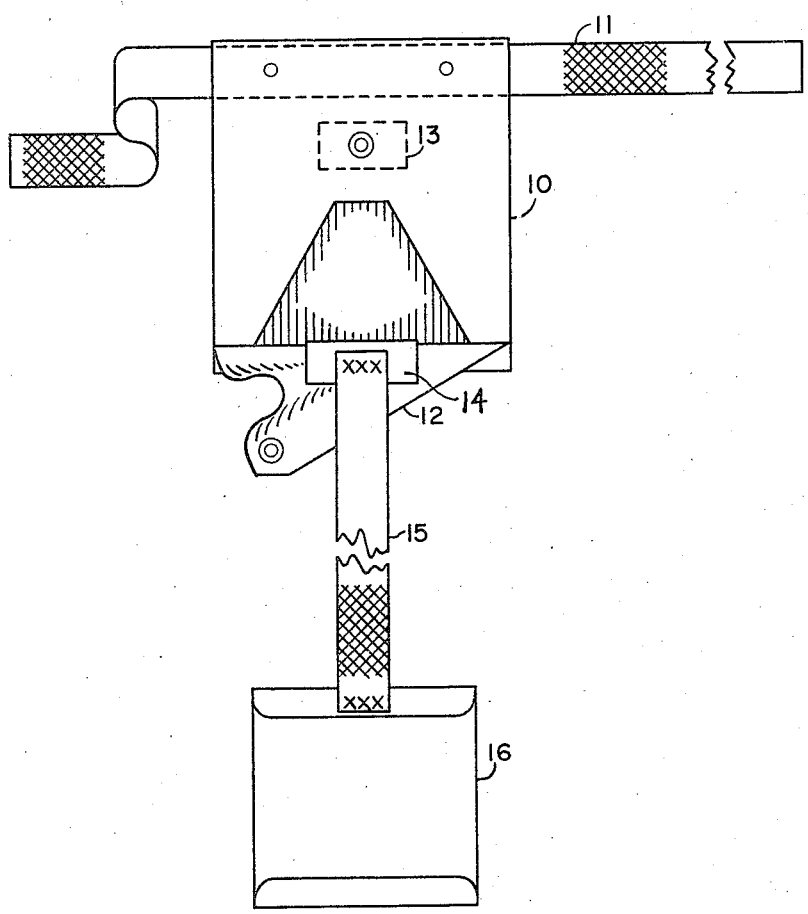
Inventors
RICHARD L. TUVE
JOHN M. FOGELBERG
FREDERIC E. BRINNICK
H. STEWART SPRINGER
By Wilbur Jones
Attorney Patented Jan. 11, 1949

2,458,540

UNITED STATES PATENT OFFICE 2,458,540

SHARK REPELLENT

Richard L. Tuve, Silver Spring, Md., John M. Fogelberg and Frederic E. Brinnick, Washington, D. C., and Horace Stewart Springer, Homestead, Fla.

Application October 7, 1944, Serial No. 557,716

5 Claims. (Cl. 167—16)

(Granted under the act of March 3, 1883, as amended April 30, 1928; 370 O. G. 757)

Our invention relates to a composition and device for discouraging the predatory intentions of carnivorous fish.

Since the beginning of the war with its submarine and air activity, numerous occasions have arisen in which men have been forced to swim for their lives. Our armed services and merchant marine have been helpful by providing the men with equipment to help them stay afloat. This phase of the problem or, rather, the equipment long ago reached a point of development where remaining afloat for extended periods offered little difficulty. In cold Atlantic waters, the greatest menace has been the cold. However, in the warm Pacific Ocean and the South Atlantic, a different menace arises for the waters are alive with carnivorous fish. The weakened condition of wounded men cast into the water puts them at a distinct disadvantage in trying to fight off sharks and barracuda which are attracted by their blood.

It is the object of our invention to provide a simple device to be attached to the life jacket which can be used to discourage the predatory activities of sharks, dogfish, barracuda and the like.

It is a second object of our invention to provide a composition of matter which, when placed in contact with sea water, will cast a protective veil of a chemical material around the swimmer.

It is a third object of our invention to provide a composition which will contaminate the water around the swimmer sufficiently to keep sharks out yet will not affect the swimmer.

Other objects and advantages of our invention will in part be obvious and in part appear hereinafter.

Accordingly our invention comprises a composition and a device to be used by swimmers in shark-infested waters comprising a water tight packet which can be opened to expose its contents comprising water soluble chemical materials disagreeable to sharks, to contaminate the surrounding water.

It is clear that the various factors affecting shark behavior will vary. That is, his reaction will depend upon his condition. If he is hungry, angry or excited it is natural to expect that his reactions will differ with the degrees of intensity of various stimuli given him. It is difficult to make any factual statement regarding the relative importance of the visual stimulus and the olfactory stimulus in the feeding of sharks. Doubtless both play parts of varying degrees depending upon the state of excitation of the shark.

An important difference between the visual and olfactory stimulus is that something approaching actual contact with the bait or game is necessary to obtain olfactory stimulus whereas visual stimulus can occur at a distance. It is known and experimentally established that copper acetate is so distasteful to sharks in certain conditions that they will ignore meat floating in water containing copper acetate. We have discovered that by combining the action of copper acetate with that of an obscuring material we are able to keep sharks from taking a bait with surprising effectiveness. The composition we use comprises a mixture of about one part copper acetate, 4 parts of a highly water-soluble dark-colored dye (preferably black or dark blue) and a small amount of "Carbowax 4000." The ingredients are intimately mixed together and pressed into a cake.

The method of using this composition will be clearly understood by reference to the drawing illustrating a packet in which it can be placed.

In the drawing 10 represents an envelope comprising the body of the packet, 11 a tape for tying it to a life jacket, 12 a flap closure and 13 a fastener. A tab 14 attached to the inside of envelope 10 carries a tape 15 to which is attached a porous container 16 for retaining the repellent composition. When not in use the tape 15 is wrapped around envelope 16 and it is inserted into envelope 10 and the flap sealed in place. The envelope and flap are made of a cloth material coated with a thermoplastic material to allow for sealing up the edges of the opening. When it is necessary to use the composition, the swimmer can grasp the end of flap 12, tear open the envelope and allow its contents to contact the water.

In testing our composition for its effectiveness it was necessary to establish certain arbitrary definitions in order to be able to compare results. Its effectiveness was determined by using it to protect attractive baits in shark infested waters. Naturally, controls corresponding to the protected baits had to be used. The following definition of effectiveness was adopted.

$$\frac{\text{Number of bites on control minus number of bites on protected bait}}{\text{Number of bites on control}} \times 100 = \text{per cent effectiveness}$$

Series I.—Tests were conducted at North River, Saint Augustine, Florida, in the summer during the night from 7:30 p. m. to 5:00 a. m. Similar equipment was used on the control lines and the protected lines with fresh shrimp as the bait in each case. The repellent used was copper acetate. The types of shark present in the waters were the small hammerhead and the shovelnose. The following results were obtained:

Number of sharks caught on control line_____ 25
Number of sharks caught on protected line___ 7
Percent effectiveness_____ 72

*Series II.*—A second series of tests was made off the Florida Keys within a radius of 25 miles of Marathon, Florida, during all hours of the day and night. Again, controls were used along with protected lines baited with fresh mullet. The protective agent used was a black dye of a nigrosine type, highly soluble in sea water and compatible with copper acetate. Sharks present in the vicinity were black tip, shovelnose, black nose and sharp nose. The sharks were aroused by occasional chumming with chopped mullet and simultaneous fishing for bottom fish. The following results were obtained:

|  | Catches | Strikes | Total |
|---|---|---|---|
| Control line | 50 | 23 | 73 |
| Protected line | 2 | 0 | 2 |
| Percent effectiveness | 96 |  | 97 |

Further tests of the effectiveness of the copper acetate-dye mixture were made in the vicinity of Mayport, Florida. The sharks observed were in an excited condition and were feeding on the trash fish discarded from the shrimp boats. Although no statistical data were taken, observation showed conclusively the effectiveness of the repellent mixture for sharks were driven away from food by addition of the repellent to the water in which the foraging fish were active.

For most effective use of the copper acetate-dye mixture as a shark repellent several necessary factors in the preparation of the unit must be observed. It is most desirable that the components of the mixture dissolve at rates corresponding to the proportions in which they are originally mixed. This is accomplished by binding the copper acetate-dye mixture with a water soluble binder such as "Carbowax."

The use of copper acetate dye mixture involved some difficulties for in its commercial form, copper acetate is a loose finely divided powder. Likewise the dye is very finely divided.

In the dry state, both powders sift through most materials. When wet by sea water, it was found the copper acetate formed various decomposition products which clogged the pores of the enclosing material. As mentioned above, the difficulty was solved by molding the dye and the copper acetate into a cake using a water soluble binder. The cake is made relatively flat so that its thickness is small compared to its breadth. In this way a nearly uniform rate of solution is maintained for a relatively constant area is exposed to the dissolving medium. Enclosure of the cake in a cotton bag of unsized uncalendered material having about 80 threads per inch was found to permit satisfactory diffusion of the copper acetate and dye into the dissolving medium.

In order to obtain adequate repellent action for an extended period without using too great a weight of material, a rate of diffusion of 30–50 grams per hour of chemical repellent was selected as desirable. We found that the cake composed of copper acetate, the dye and a binder, gave the desired rate of solution. The cake was enclosed in a cotton bag as described above. Accordingly our shark repellent device comprises: about four parts of a highly water soluble dark blue or black dye of the nigrosine type, one part of copper acetate and enough "Carbowax" to mold the whole into a firm cake. The cake made in these proportions gives a rate of solution of about forty grams per hour in sea water at a temperature of about fifty degrees Fahrenheit. The temperature is a variable which in using the composition is not under control. The size of the cake will determine its life in water.

Since certain changes may be made in the composition used as the repellent and modifications effected in the device for putting it to use without departing from the scope of the invention, it is intended that all matter contained in the above description or shown in the accompanying drawing shall be interpreted as illustrative and not in a limiting sense.

The invention described herein may be manufactured and used by or for the Government of the United States of America for Government purposes without the payment of any royalty thereon or therefor.

Having described our invention, what we claim as new and desire to secure by Letters Patent is:

1. A carnivorous fish repellent composition consisting of a mixture of copper acetate, a highly water soluble dark colored dye and a water soluble wax binder.

2. A carnivorous fish repellent composition consisting of a mixture of copper acetate, a highly water soluble black dye and a water soluble wax binder.

3. A carnivorous fish repellent device for use by swimmers in shark infested waters comprising, a packet containing sealed therein a cake consisting of copper acetate, a highly water soluble dark colored dye and a binder in proper preparation to bond the copper acetate and the dye together and to control their respective rates of solution when exposed to sea water.

4. A carnivorous fish repellent composition consisting of a mixture of about one part by weight of copper acetate, about four parts by weight of a highly water soluble nigrosine type dye and a proportion of "Carbowax" in weight sufficient to bind the said mixture into a firm cake.

5. A carnivorous fish repellent device for use by swimmers in shark infested waters comprising a packet, a sealed cake in said packet consisting of about one part by weight of copper acetate, about four parts by weight of a highly water soluble dark-colored dye and a proportion of "Carbowax" in weight sufficient to bind the copper acetate and the dye together into a firm cake and to control their respective rates of solution when said cake is exposed to sea water.

RICHARD L. TUVE.
JOHN M. FOGELBERG.
FREDERIC E. BRINNICK.
H. STEWART SPRINGER.

REFERENCES CITED

The following references are of record in the file of this patent:

UNITED STATES PATENTS

| Number | Name | Date |
|---|---|---|
| 1,947,320 | Truffaut et al. | Feb. 13, 1934 |
| 2,204,229 | Rossander et al. | June 11, 1940 |
| 2,389,719 | Dinsley | Nov. 27, 1945 |

Certificate of Correction

Patent No. 2,458,540.  January 11, 1949.

RICHARD L. TUVE ET AL.

It is hereby certified that error appears in the printed specification of the above numbered patent requiring correction as follows:

Column 4, lines 39 and 40, claim 3, for the word "preparation" read *proportion*; and that the said Letters Patent should be read with this correction therein that the same may conform to the record of the case in the Patent Office.

Signed and sealed this 17th day of May, A. D. 1949.

[SEAL]

THOMAS F. MURPHY,
*Assistant Commissioner of Patents.*